Jan. 26, 1926.
E. A. LANGLEY
1,570,751
REAR VIEW MIRROR
Filed Dec. 3, 1923
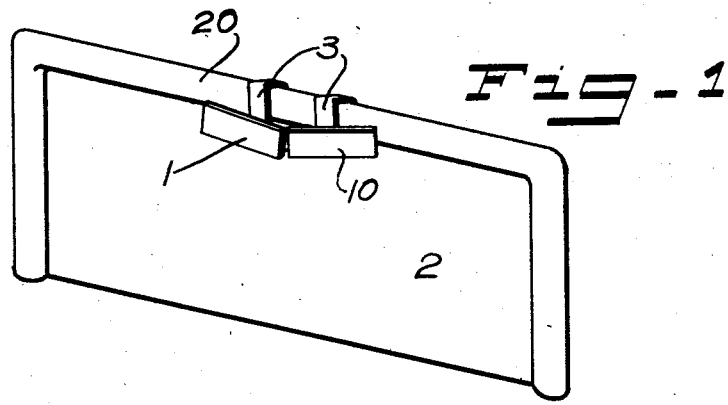
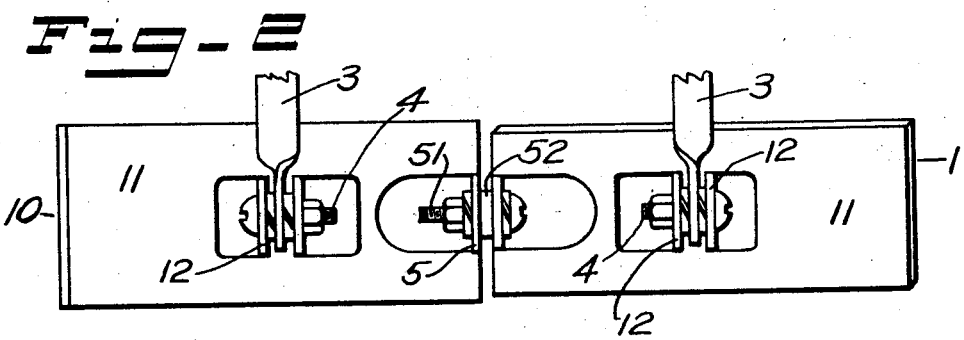
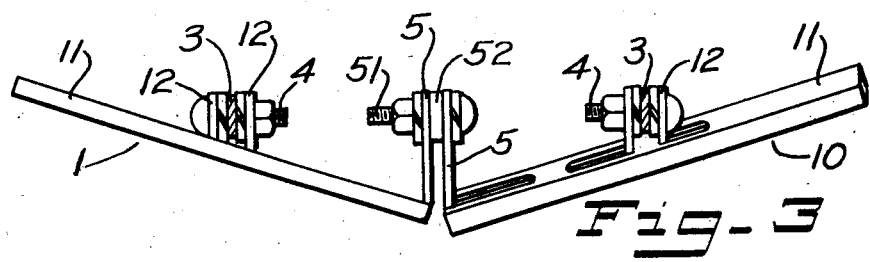
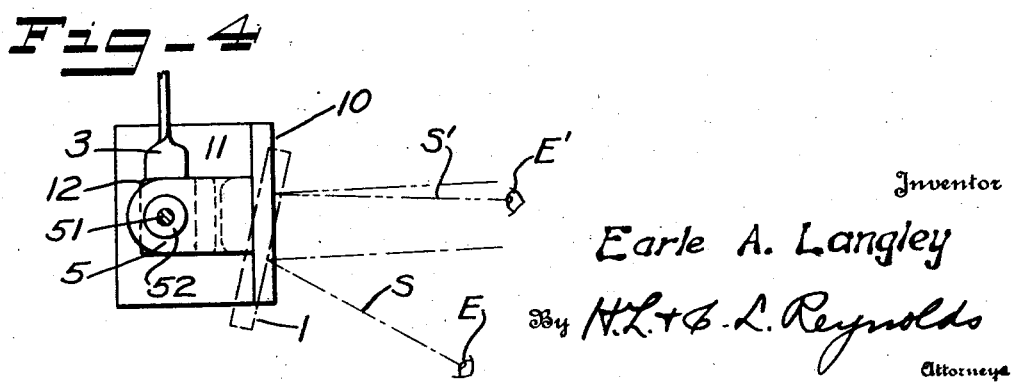
Inventor
Earle A. Langley
By H.L. & G.L. Reynolds
Attorneys Patented Jan. 26, 1926.

1,570,751

UNITED STATES PATENT OFFICE.

EARLE A. LANGLEY, OF DETROIT, MICHIGAN, ASSIGNOR TO SEES-ALL MFG. CO., OF SEATTLE, WASHINGTON, A CORPORATION OF WASHINGTON.

REAR-VIEW MIRROR.

Application filed December 3, 1923. Serial No. 678,238.

*To all whom it may concern:*

Be it known that I, EARLE A. LANGLEY, a citizen of the United States of America, and resident of the city of Detroit, in the county of Wayne and State of Michigan, have invented certain new and useful Improvements in Rear-View Mirrors, of which the following is a specification.

My invention relates to rear view mirrors, particularly to such mirrors as are shown in the patent to Rees, No. 1,426,010, which includes two rigidly connected and angularly disposed reflectors arranged to be supported upon the windshield of an automobile for the purpose of enabling both the driver and the passenger beside him to see objects behind the car through a window in the rear of the car.

Occasionally the height of the eyes of the driver will not be the same as the height of the eyes of his passenger, and consequently it will not be possible for such a mirror to be so adjusted as to permit the driver to see objects in the rear of the car and for the passenger to see them at the same time. If the mirror is adjusted at the proper height so that the angle of reflection to the driver's eye is right for his vision through the rear window, the angle of sight to the passenger's eye may be greater, and thus will drop lower, and will only permit reflection of the car top, and will not permit the passenger a view through the rear window. It is my present object, particularly, to provide means whereby two such mirrors which are permanently angularly disposed, transversely, can be independently adjusted about a transversely extending or lateral pivot axis forming a chord of the angle between the mirrors, to the end that the angle of each, relative to this horizontal pivot axis, may be made right to permit vision by both the driver and the passenger through the rear window, notwithstanding a difference in the height of the eyes of the driver and passenger.

It is also my object to make such simple changes as will adapt the Rees mirror to independent adjustment of the two reflectors for the purpose mentioned above, while retaining all of its advantages, including the permanent angular relation between the two reflectors.

My invention comprises those novel parts and combinations thereof as are shown in the accompanying drawings, described in the specification, and particularly defined by the claims terminating the same.

In the accompanying drawings I have shown my invention in the form which is now preferred by me.

Figure 1 is a perspective view of my mirror mounted upon the windshield of an automobile.

Figure 2 is a view of the reverse side of my improved mirror, that is, the side which is towards the front of the car.

Figure 3 is a top plan view of the mirror.

Figure 4 is a section along the median plane between the angle formed by the two reflectors, the adjacent end of the omitted reflector being indicated in dot-and-dash lines.

Essentially the rear view mirror consists of two similar reflecting surfaces designated, for convenience, 1 and 10, which are suitably connected and supported, as from the frame bar 20 of the windshield 2. Ordinarily the mirror is supported by brackets 3 which are suitably clamped upon the frame 20 to which the mirrors are pivotally connected.

The reflectors 1 and 10 I have shown as encased, except on the reflecting surface, in a sheet metal casing 11. From the casing 11, pivot ears 12 are upraised, these pivot ears being connected to the lower ends of the brackets 3 by means of horizontal transverse pivot pins 4. Any other suitable connection might be employed, and in fact, a single bracket might be employed to support both reflectors. In the form illustrated, where two brackets and two pivot pins are employed, the pivot pins should be coaxial.

The two reflectors 1 and 10 have adjacent ends and extend laterally from these adjacent ends at an angle. As in the Rees patent, I prefer that they should extend laterally and forwardly at a definitely determined and fixed angle. By this means the driver, whose eye E is represented in Figure 4, visualizes an object in the rear of the car along the line of sight S through the window which is in the rear of every car. The passenger, whose eye is represented at E' in Figure 4, by looking in the reflector 10 along the line of sight S', will visualize objects through the same window.

According to my invention the two reflectors 1 and 10 are fixedly positioned only as to the relative angular positions of the major axes of their planes, and are adjustable, either separately or jointly, about a pivot axis which forms a chord of the angle between the two reflectors. It is therefore possible to adjust the mirrors about such horizontal chordal axis to accommodate its vertical angle to the line of sight S, which requires a greater angle of incidence and reflection to accommodate the lower level of the eye E relative to the eye E'.

I prefer that the two mirrors be connected in such manner as to maintain their outer ends spaced by the same amount, that is, to maintain a constant relative longitudinal angle, and yet in such way as to permit the angular adjustment about the transverse pivot axis, as indicated above. A number of ways may be devised to permit this, and I do not wish to be limited only to the one shown and described herein. According to the arrangement shown in the drawings, I provide positioning brackets 5 upon each reflector and preferably at the end which is adjacent the other reflector. These project from the same side of the reflector, or rather from the casing 11 which carries the pivot ears 12. A common pivot pin 51 is passed through apertures provided therefor in the positioning brackets 5. If desired, a spacing washer 52 may be positioned between the brackets 5. Theoretically the common pivot pin 51 should be coaxial with the two pivot pins 4 which connect the individual reflectors to the brackets 3, although practically the spring of the parts will permit some variation from such exact position.

With the individual mirrors so mounted and connected together it is possible to turn either of the reflectors 1 or 10, about the axis defined by the pivot pins 4 and 51, independently of the other reflector. In doing so, the angle relative to the median plane through the angle between the two reflectors and which controls the lateral divergence of the reflection through the rear window, is not affected. The vertical angle of divergence is affected thereby, and for each mirror independently of the other.

What I claim as my invention is:

1. A rear-view mirror for automobiles comprising two mirrors, separate supporting frames for each mirror, each frame having at one end a connecting ear and supporting pivot ears located approximately at the middle of the length of the frame, the two connecting ears and each of the supporting ears having its individual clamping pivot member, all of said pivot members being located upon a common axis, whereby separate elevational angular adjustment may be given to the individual mirrors without disturbing their longitudinal angular relation with each other.

2. In combination with a pair of reflectors, pivot ears upon each reflector, a fixed supporting bracket for each reflector, a transversely extending pivot pin connecting each bracket with its corresponding pivot ears, said pivot pins being coaxial, a positioning bracket upon each reflector, and a common pivot pin connecting said positioning brackets, and disposed coaxially with said first pivot pins.

Signed at Detroit, Wayne County, Michigan, this 30th day of November, 1923.

EARLE A. LANGLEY.